US012382342B2

(12) United States Patent
Li et al.

(10) Patent No.: US 12,382,342 B2
(45) Date of Patent: Aug. 5, 2025

(54) TRAFFIC SCENARIO CLUSTERING AND LOAD BALANCING WITH DISTILLED REINFORCEMENT LEARNING POLICIES

(71) Applicant: SAMSUNG ELECTRONICS CO., LTD., Suwon-si (KR)

(72) Inventors: Jimmy Li, Longueuil (CA); Di Wu, Saint Laurent (CA); Yi Tian Xu, Montreal (CA); Tianyu Li, Montreal (CA); Seowoo Jang, Seoul (KR); Xue Liu, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 419 days.

(21) Appl. No.: 17/870,212

(22) Filed: Jul. 21, 2022

(65) Prior Publication Data

US 2023/0117162 A1    Apr. 20, 2023

Related U.S. Application Data

(60) Provisional application No. 63/256,963, filed on Oct. 18, 2021.

(51) Int. Cl.
*H04W 28/086*     (2023.01)
*G06N 20/00*      (2019.01)
*H04W 28/08*      (2023.01)

(52) U.S. Cl.
CPC ........ *H04W 28/0861* (2023.05); *G06N 20/00* (2019.01); *H04W 28/0925* (2020.05)

(58) Field of Classification Search
CPC ........ H04W 28/0861; H04W 28/0925; G06N 20/00; G06N 3/006
See application file for complete search history.

(56) References Cited

FOREIGN PATENT DOCUMENTS

WO    WO-2021219214 A1 * 11/2021 ........... G06F 9/5066
WO    2021/257160 A1    12/2021

OTHER PUBLICATIONS

Rusu et al. Policy Distillation, arXiv preprint arXiv: 1511.06295 (Year: 2016).*

(Continued)

*Primary Examiner* — Ayaz R Sheikh
*Assistant Examiner* — David Zhijun Sun
(74) *Attorney, Agent, or Firm* — Sughrue Mion, PLLC

(57) ABSTRACT

The present disclosure provides for methods, apparatuses, and non-transitory computer-readable storage media for load balancing traffic scenarios by a network device. In an embodiment, a method includes training a plurality of learning agents to load balance a respective plurality of traffic scenarios to obtain a plurality of control policies. The method further includes performing at least one clustering iteration. Each clustering iteration includes selecting a pair of control policies and merging the pair of control policies into a clustered control policy that replaces the pair of control policies. The method further includes determining to stop the performing of the at least one clustering iteration when a quantity of control policies remaining in the plurality of control policies meets a predetermined value. The method further includes deploying to each base station of a plurality of base stations a corresponding control policy from the plurality of control policies.

20 Claims, 5 Drawing Sheets

(56) References Cited

OTHER PUBLICATIONS

Tolli, Antti et al., "Adaptive Load Balancing between Multiple Cell Layers", Proceedings IEEE 56th Vehicular Technology Conference, 2002, pp. 1691-1695, vol. 3, doi: 10.1109/VETECF.2002.1040504.

Viering, Ingo et al., "A mathematical perspective of self-optimizing wireless networks," 2009 IEEE International Conference on Communications, 2009, pp. 1-6, doi: 10.1109/ICC.2009.5198628.

Jansen, Thomas et al., "Handover parameter optimization in LTE self-organizing networks," 2010 IEEE 72nd Vehicular Technology Conference—Fall, 2010, pp. 1-5, doi: 10.1109/VETECF.2010.5594245.

Munoz, P. et al., Optimization of load balancing using fuzzy Q-Learning for next generation wireless networks, Expert Systems with Applications, vol. 40, Issue 4, 2013, pp. 984-994, ISSN 0957-4174.

Mwanje, Stephen et al., "A Q-Learning Strategy for LTE Mobility Load Balancing", 2013 IEEE 24th Annual International Symposium on Personal, Indoor, and Mobile Radio Communications (PIMRC), 2013, pp. 2154-2158, doi:10.1109/PIMRC.2013.6666500.

Kang, Jikun et al., "Hierarchical Policy Learning for Hybrid Communication Load Balancing", ICC 2021—IEEE International Conference on Communications, pp. 1-6. IEEE, 2021.

Hinton, Geoffrey et al., "Distilling the Knowledge in a Neural Network", arXiv:1503.02531v1, [stat.ML], Mar. 9, 2015.

Czarnecki, Wojciech M. et al., "Distilling Policy Distillation", Proceedings of the 22nd International Conference on Artificial Intelligence and Statistics (AISTATS), 2019, vol. 90, pp. 1331-1340. PMLR, 2019.

\* cited by examiner

TRAFFIC SCENARIO CLUSTERING AND LOAD BALANCING WITH DISTILLED REINFORCEMENT LEARNING POLICIES

CROSS-REFERENCE TO RELATED APPLICATIONS

This application is based on and claims priority under 35 U.S.C. § 119 to U.S. Provisional Patent Application No. 63/256,963, filed on Oct. 18, 2021, in the U.S. Patent and Trademark Office, the disclosure of which is incorporated herein in its entirety by reference.

BACKGROUND

1. Field

The present disclosure relates generally to communication systems, and more particularly to methods and apparatuses for traffic scenario clustering and load balancing with distilled reinforcement learning policies.

2. Description of Related Art

Related communication systems, such as wireless communication systems (e.g., third generation (3G), Long Term Evolution (LTE), fifth generation (5G)) may be deployed to provide various telecommunication services such as telephony, video, data, messaging, and broadcasts. Load balancing is an important task in network optimization of wireless communication systems that is aimed at evenly distributing traffic loads among the available radio resources.

In order to meet ever increasing demands for wireless data traffic, and anticipating a growing number of real-time applications (e.g., video streaming, virtual reality), load balancing is becoming increasingly important for maintaining quality-of-service (QoS) and customer satisfaction. For example, in related wireless communication systems, a significant portion of traffic volume (e.g., 50%) may frequently be served by a small portion (e.g., 15%) of the available radio resources. Thus, improvements in load balancing may potentially improve QoS and customer satisfaction in such wireless communication systems.

In addition to the traffic increases, emerging wireless communication technologies, such as high band (millimeter wave) 5G (e.g., FR2, FR2X, FR4) and the like, may rely on base stations with a smaller coverage area (e.g., range) which may result in a higher base station density. Such network topologies may exacerbate difficulties in managing load balancing policies across the base stations deployed within a geographic region.

Thus, there exists a need for further improvements in load balancing of radio resources in wireless communication systems. Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for traffic scenario clustering and load balancing are disclosed by the present disclosure.

According to an aspect of the disclosure, a method for load balancing traffic scenarios by a network device includes training a plurality of learning agents to load balance a respective plurality of traffic scenarios to obtain a plurality of control policies. The method further includes performing at least one clustering iteration. Each clustering iteration includes selecting, from the plurality of control policies, a pair of control policies, and merging the pair of control policies into a clustered control policy that replaces the pair of control policies from the plurality of control policies. The method further includes determining to stop the performing of the at least one clustering iteration when a quantity of control policies remaining in the plurality of control policies meets a predetermined value. The method further includes deploying to each base station of a plurality of base stations a corresponding control policy from the plurality of control policies.

According to another aspect of the disclosure, an apparatus for load balancing traffic scenarios includes a memory storage storing computer-executable instructions, and a processor communicatively coupled to the memory storage. The processor is configured to execute the computer-executable instructions and cause the apparatus to train a plurality of learning agents to load balance a respective plurality of traffic scenarios to obtain a plurality of control policies. The computer-executable instructions further cause the apparatus to perform at least one clustering iteration. Each clustering iteration of the least one clustering iteration includes to select, from the plurality of control policies, a pair of control policies, and to merge the pair of control policies into a clustered control policy that replaces the pair of control policies from the plurality of control policies. The computer-executable instructions further cause the apparatus to determine to stop to perform the at least one clustering iteration when a quantity of control policies remaining in the plurality of control policies meets a predetermined value. The computer-executable instructions further cause the apparatus to deploy to each base station of a plurality of base stations a corresponding control policy from the plurality of control policies.

According to another aspect of the disclosure, a non-transitory computer-readable storage medium storing computer-executable instructions for load balancing traffic scenarios by a network device. The computer-executable instructions are configured, when executed by one or more processors of the network device, to cause the network device to train a plurality of learning agents to load balance a respective plurality of traffic scenarios to obtain a plurality of control policies. The computer-executable instructions further cause the network device to perform at least one clustering iteration. Each clustering iteration of the least one clustering iteration includes to select, from the plurality of control policies, a pair of control policies, and to merge the pair of control policies into a clustered control policy that replaces the pair of control policies from the plurality of control policies. The computer-executable instructions further cause the network device to determine to stop to perform the at least one clustering iteration when a quantity of control policies remaining in the plurality of control policies meets a predetermined value. The computer-executable instructions further cause the network device to deploy to each base station of a plurality of base stations a corresponding control policy from the plurality of control policies.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
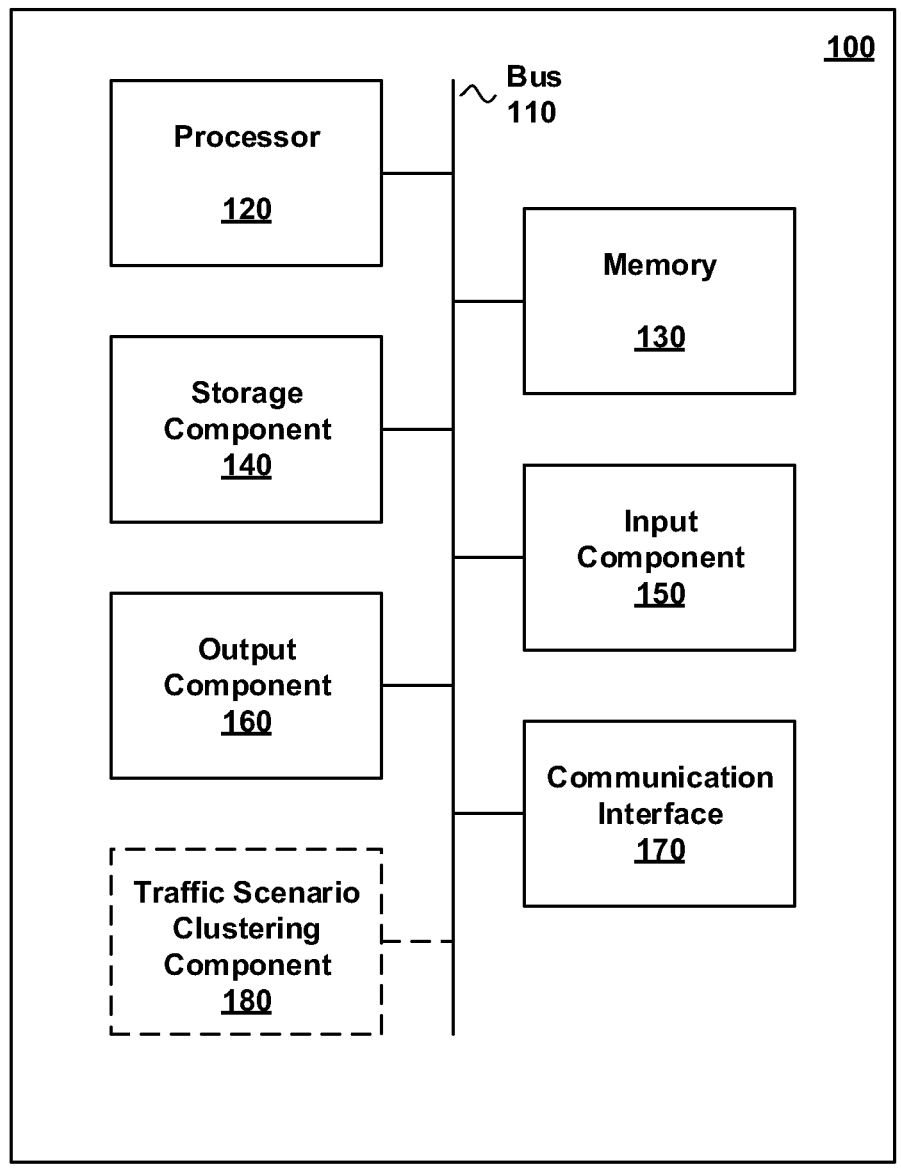
FIG. 1 depicts an example of a device that may be used in implementing one or more aspects of the disclosure, according to one or more example embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

As a general introduction to the subject matter described in more detail below, aspects described herein are directed towards systems, devices, and methods for traffic scenario clustering and load balancing. Aspects described herein may be used to train reinforcement learning agents to obtain control policies configured to load balance traffic scenarios, and to iteratively cluster the control policies until a desired number of control policies is reached.

Related wireless communication systems may employ one or more load balancing techniques to attempt to maximize the use of system resources, such as radio resources (e.g., frequency bands). For example, related base stations of such wireless communication systems may establish connections and communicate with client devices (e.g., user equipment (UE)) using a plurality of frequencies and/or frequency bands (e.g., FR2, FR2X, FR4). Typically, the base station may support a predetermined quantity of UEs at each frequency and/or frequency band. Thus, a goal of load balancing may be to balance the quantity of UEs connected to the base station across the available frequencies supported by the base station.

To that end, it may be difficult to create a single load balancing policy that may achieve a desired level of load balancing at every base station of a wireless communication system. For example, communication traffic patterns near each base station may differ from the remaining base stations. That is, types of content (e.g., voice, video, data), bandwidth and/or throughput requirements, and quality-of-service (QoS) requirements may differ among the base stations. For another example, a distribution pattern of the UEs within a coverage area of each base station may also vary across the base stations. Thus, the base stations may require distinct load balancing policies that can accommodate for the different traffic scenarios of each base station.

However, deploying a distinct load balancing policy to each base station of the wireless communication system may result in excessive redundancies and overhead that may be needed to create, manage, and store a significant quantity of different load balancing policies. For example, 5G deployment scenarios typically include denser base station layouts comprising a larger quantity of base stations within a geographic region. Thus, potentially exacerbating difficulties in managing load balancing policies across the base stations deployed in the geographic region.

Aspects presented herein provide for multiple manners for a network device to perform traffic scenario clustering and load balancing. The traffic scenario clustering and load balancing may include obtaining load balancing policies by training reinforcement learning agents using traffic scenarios, and iteratively clustering the load balancing policies until a desired number of load balancing policies is reached.

As noted above, certain embodiments are discussed herein that relate to traffic scenario clustering and load balancing. Before discussing these concepts in greater detail, however, an example of a computing device that may be used in implementing and/or otherwise providing various aspects of the disclosure will first be discussed with respect to FIG. 1.

FIG. 1 depicts an example of a device 100 that may be used in implementing one or more aspects of the disclosure in accordance with one or more illustrative aspects discussed herein. For example, device 100 may, in some instances, implement one or more aspects of the disclosure by reading and/or executing instructions and performing one or more actions accordingly. In one or more arrangements, device 100 may represent, be incorporated into, and/or include a desktop computer, a computer server, a mobile device (e.g., a laptop computer, a tablet computer, a smart phone, any other type of mobile computing device, etc.), and/or any other type of data processing device.

For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a traffic scenario clustering component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the traffic scenario clustering component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

In some embodiments, the device 100 may comprise the traffic scenario clustering component 180 configured to perform traffic scenario clustering and load balancing. The traffic scenario clustering component 180 may be configured to train a plurality of learning agents to load balance a respective plurality of traffic scenarios to obtain a plurality of control policies. The traffic scenario clustering component 180 may be further configured to perform at least one clustering iteration, where each clustering operation includes selecting a pair of control policies from the plurality of control policies and merging the pair of control policies into a clustered control policy that replaces the pair of control policies from the plurality of control policies. The traffic scenario clustering component 180 may be further configured to determine to stop the performing of the at least one clustering operation when a quantity of control policies remaining in the plurality of control policies meets a predetermined value. The traffic scenario clustering component 180 may be further configured to deploy to each base station of a plurality of base stations a corresponding control policy from the plurality of control policies.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Having discussed an example of a device that may be used in providing and/or implementing various aspects of the disclosure, a number of embodiments will now be discussed in greater detail. In particular, and as introduced above, some aspects of the disclosure generally relate to traffic scenario clustering and load balancing. In the description below, various examples illustrating how traffic scenario clustering and load balancing may be provided in accordance with one or more embodiments will be discussed.

Figure 2:
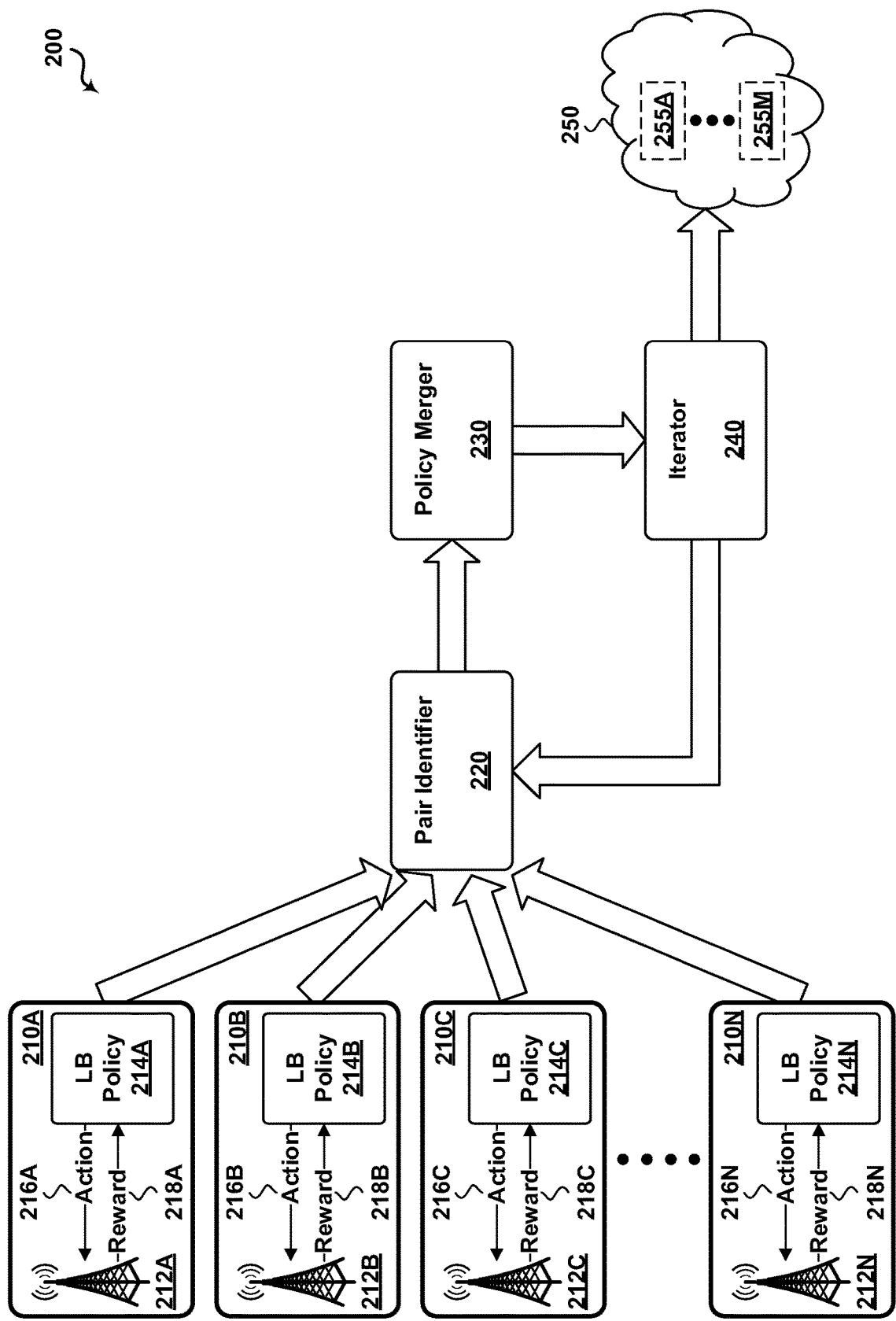
FIG. 2 depicts an example of traffic scenario clustering and load balancing, according to one or more example embodiments.

FIG. 2 depicts an example of traffic scenario clustering and load balancing, according to one or more example embodiments. Referring to FIG. 2, an example traffic scenario clustering and load balancing process 200 that implements one or more aspects of the disclosure is illustrated. In some embodiments, at least a portion of the traffic scenario clustering and load balancing process 200 may be performed by the device 100 of FIG. 1. Alternatively or additionally, another computing device (e.g., server, laptop, smartphone, base station, UE, etc.) that includes the traffic scenario clustering component 180 may perform at least a portion of the traffic scenario clustering and load balancing process 200.

As shown in FIG. 2, the traffic scenario clustering and load balancing process 200 may generate a concise set of load balancing policies that can address a variety of traffic scenarios. That is, given a set of traffic scenarios, the traffic scenario clustering and load balancing process 200 may cluster similar load balancing policies that have been learned from the traffic scenarios and output one load balancing policy for each cluster. The clustered load balancing policies may be stored in a policy bank in which each clustered load balancing policy is configured to perform load balancing on a family of similar traffic scenarios. A clustered load balancing policy may be deployed to serve the traffic patterns at one or more base stations (e.g., a target network sector).

A traffic scenario may refer to a particular traffic pattern (e.g., content types, bandwidth requirements, throughput requirements, QoS requirements) and/or a particular distribution (e.g., geographic locations, location density) of UEs within a coverage area of one or more base stations of a wireless communication system. That is, the traffic scenarios may correspond to network traffic of base stations serving a geographic region.

Related wireless communication systems may perform load balancing using rule-based methods. The present disclosure uses a reinforcement learning (RL) agent (e.g., 210A, 210B, 210C, . . . , 210N; hereinafter "210", generally) to create a load balancing policy (e.g., 214A, 214B, 214C, . . . , 214N; hereinafter "214", generally) given a particular traffic scenario (e.g., 212A, 212B, 212C, . . . , 212N; hereinafter "212", generally). That is, a plurality of learning agents are trained to load balance a respective plurality of traffic scenarios to obtain a plurality of load balancing policies.

Although FIG. 2 depicts four RL agents 210, it should be understood that any number of RL agents 210 may be trained to load balance any number of traffic scenarios 212 to obtain any number of load balancing policies 214. For example, N may be any positive integer greater than one. Notably, the present disclosure may be employed in any wireless communication system in which load balancing policies are used to perform load balancing.

In some embodiments, the RL agents 210 may be configured to solve a load balancing problem (e.g., inter-frequency) with a goal of balancing UEs connected (e.g., active connections and idle connections) among the serving frequencies of a particular base station, given a traffic scenario 212. That is, the RL agents 210 may be separately trained to generate independent load balancing policies 214 for the plurality of traffic scenarios 212.

For example, the RL agents 210 may be trained, using RL, to load balance the traffic scenarios using active UE load balancing to handover at least one actively-transmitting UE from a first cell to a second cell. Alternatively or additionally, the RL agents 210 may be trained, using, RL to load balance the traffic scenarios using idle UE load balancing to influence the cell on which at least one idle UE is camping.

The RL agents 210 may be configured to take actions (e.g., 216A, 216B, 216C, . . . , 216N; hereinafter "216", generally) in an environment based on a state of the traffic scenario 212 in order to maximize a cumulative reward (e.g., 218A, 218B, 218C, . . . , 218N; hereinafter "218", generally). The state (e.g., observations, measurements) for the RL agent 210 may refer to at least one of throughout, active UE count, and physical resource block (PRB) usage for each frequency of the base station. The actions 216 taken by the RL agent 210 may comprise adjusting one or more reference signal received power (RSRP) thresholds, as described in further detail below. The rewards 218 for the RL agent 210 may comprise a weighted sum of a plurality of key performance indicators (KPIs). For example, a KPI may comprise a minimum throughput among the frequencies of the base station, where a higher minimum throughput may be preferred over a lower minimum throughput. For another example, another KPI may comprise a standard deviation of throughput among the frequencies of the base station, where a lower standard deviation may be preferred over a higher standard deviation. The purpose of the rewards 218 is to encourage an even distribution of traffic among the frequencies.

In some embodiments, the RL agents 210 may be provided with respective initial states and/or respective traffic scenarios 212. In response, the RL agents 210 may encounter respective sets of states that may be shaped by the respective traffic scenarios 212 and/or the respective state transition distributions. For example, the initial states and the sets of states may consist of high-dimensional vectors that comprise at least one of a quantity of active UE in a cell, a bandwidth utilization of the cell, an average throughput of the cell, and physical resource block usage in the cell. The state transition distributions may describe a probability of encountering a state given a previous state and a previous action taken by the RL agent 210.

The RL agents 210 may be configured to iteratively adjust and apply at least one action vector of load balancing control parameters that comprise at least one of an active handover threshold and a camping cell threshold. In some embodiments, the RL agents 210 may determine, based on a reward vector received by the RL agents 210 in response to taking an action, the load balancing policy 214 that maximizes the reward vector of the respective traffic scenarios 212. For example, the reward vector may comprise weighted averages of cell performance metrics.

The pair identifier component 220 may be configured to obtain the load balancing policies 214 that have been created by the RL agents 210 for each of the traffic scenarios 212. The pair identifier component 220 may be implemented by the device 100 of FIG. 1 and/or the traffic scenario clustering component 180.

In some embodiments, the pair identifier component 220 may identify (e.g., select) the most similar pair of load balancing policies 214. The pair identifier component 220 may compute a similarity between every pair of policies of the load balancing policies 214. For example, the policy similarity computation may calculate a mean difference between the output of a first load balancing policy 214A and the output of a second load balancing policy 214B, given the states encountered by the second load balancing policy 214B. In such an example, the pair identifier component 220 may identify the pair of load balancing policies 214 having a largest similarity and/or a smallest difference when compared to other similarities and/or differences between the remaining pairs of load balancing policies 214.

Notably, the similarity computation is not symmetric. That is, a similarity between the first load balancing policy 214A and the second load balancing policy 214B may differ from a similarity between the second load balancing policy 214B and the first load balancing policy 214A. The asymmetry may result from the output of the first load balancing policy 214A, given the states encountered by the second load balancing policy 214B, being different from the output of the second load balancing policy 214B, given the states encountered by the first load balancing policy 214A.

The policy merger component 230 may be configured to merge the pair of load balancing policies 214 identified by the pair identifier component 220. The policy merger component 230 may be implemented by the device 100 of FIG. 1 and/or the traffic scenario clustering component 180.

The policy merger component 230 may merge the pair of load balancing policies 214 into a clustered control policy that replaces the pair of load balancing policies 214 from the plurality of load balancing policies 214. That is, a merging operation of the pair of control policies reduces the quantity of load balancing policies in the plurality of load balancing policies 214 by one.

In some embodiments, the policy merger component 230 may merge the pair of load balancing policies 214 using a process known as knowledge distillation. For example, the policy merger component 230 may train a student policy to mimic the first load balancing policy 214A and to mimic the second load balancing policy 214B of the pair of load balancing policies 214. In such an example, the student policy may be trained using a training loss calculation based on a first divergence (e.g., Kullback-Leibler (KL) divergence) between the student policy and the first load balancing policy 214A, and a second divergence between the student policy and the second load balancing policy 214B. The policy merger component 230 may select, as the clustered control policy, the student policy that minimizes the training loss.

The iterator component 240 may be configured to determine whether to stop the performing of pair identifying of the pair identifier component 220 and the merging of the policy merger component 230 when a quantity of load balancing policies 214 remaining in the plurality of load balancing policies 214 meets a predetermined value (e.g., a threshold). The iterator component 240 may be implemented by the device 100 of FIG. 1 and/or the traffic scenario clustering component 180.

The predetermined value of remaining load balancing policies 214 may be selected such that a possible performance degradation impact due to the reduced quantity of load balancing policies may be acceptable. That is, as a number of clustering iterations increases, a number of remaining load balancing policies 214 decreases. With fewer remaining load balancing policies 214, each remaining load balancing policy may need further generalize in order to perform load balancing across more traffic scenarios. Such generalization may lead to performance degradations if the number of remaining load balancing policies 214 is below the predetermined value, for example.

In some embodiments, the iterator component 240 may store the resulting load balancing policies (e.g., 255A, . . . , 255M; hereinafter "255", generally) in a policy bank 250. That is, a result of the traffic scenario clustering and load balancing process 200 may be a concise policy bank 250, which contains a set of resulting load balancing policies 255 that may be deployed to the base stations.

The policy bank 250 may comprise a single database or may comprise different logical, virtual, or physical databases. Alternatively or additionally, the policy bank 250 may be implemented by one or more data processing devices, such as any type of known computer, server, or data processing device. For example, the policy bank 250 may comprise a processor, a PC, a PCB comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device. Those of skill in the art will appreciate that the functionality of the policy bank 250 as described herein may be spread across multiple data processing devices, for example, to distribute processing load across multiple computers, to segregate transactions based on geographic location, user access level, quality of service (QoS), etc. The present disclosure is not limited in this regard.

In some embodiments, the deploying of a resulting load balancing policy 255 to each base station of the plurality of base stations may include selecting, from the policy bank 250, the corresponding control policy from the plurality of control policies for each base station of the plurality of base stations, based on selection criteria. As such, a same resulting load balancing policy 255 may be deployed to two or more base stations.

Alternatively of additionally, the resulting load balancing policies 255 may be deployed from the policy bank 250 to the plurality of base stations and the base stations may select the resulting load balancing policy 255 to be deployed. In other embodiments, the base stations may access the selected resulting load balancing policy 255 from the policy bank 250. The present disclosure is not limited in this regard.

Although FIG. 2 depicts two resulting load balancing policies 255, it should be understood that any number resulting load balancing policies 255 may be stored in the policy bank 250. For example, M may be any positive integer greater than one. Notably, the present disclosure may be employed in any wireless communication system in which load balancing policies are stored in a policy bank.

Advantageously, the aspects presented herein may provide for traffic scenario clustering and load balancing by network devices of a wireless communication system. In some aspects, RL agents may generate load balancing policies that may be specific to a corresponding traffic scenario. In other aspects, the load balancing policies may be iteratively selected and merged until a desired quantity of load balancing policies is met. That is, the resulting load balancing policies may be optimized to perform load balancing on the corresponding traffic scenarios. Furthermore, the load balancing policies learned from the traffic scenarios are compared and merged, rather than comparing system transition dynamics (e.g., traffic scenarios) which may be difficult to model. As such, the aspects presented herein may allow for reduced overhead for managing load balancing policies and increased efficiency in the utilization of radio resources by the wireless communication system when compared to related wireless communication systems.

In some embodiments, a wireless communication network may comprise a plurality of base stations, where each base station has $N_s$ sectors and each sector has $N_c$ cells. Each cell may serve up to a predetermined quantity of UE (e.g., users) at a particular carrier frequency and direction range with respect to the base station the UE resides on. The cells on each base station may be grouped in $N_s$ non-overlapping direction ranges, or sectors. Load balancing may move UEs between cells in a same sector of a same base station, may move UEs between cells in different sectors of a same base station, and/or may move UEs between different base stations. The present disclosure may focus on inter-frequency load balancing which balances a load between cells of a same sector of a base station. However, the disclosure is not limited in this regard. That is, the concepts presented herein may be utilized in other types of load balancing without deviating from the scope of the disclosure.

Aspects of the present disclosure may utilize active UE load balancing and idle UE load balancing. Active UE load balancing may refer to moving (e.g., transferring) UEs between cells using handovers while the UEs are actively transmitting data. That is, the connection between the UE and the base station may be active. In such scenarios, a target (destination) cell may be selected by comparing an RSRP of the UE at a serving (source) cell and the neighboring (candidate) cells. The handover condition for active UE load balancing may be calculated using Equation 1:

$$RSRP_j > RSRP_i + \propto_{i,j} + H \quad \text{(Eq. 1)}$$

where $RSRP_j$ and $RSRP_i$ represent the signal qualities measured at the serving cell i and the neighboring cell j, $\propto_{i,j}$ represents a threshold for triggering a handover from cell i to cell j, and H is the hysteresis. Optimizing for $\propto_{i,j}$ may result in an ability to control the service boundary (e.g., handover boundary) between the two cells. Hence, active UE load balancing may be achieved by optimizing the values for all $\propto_{i,j}$, where i, j ∈ {1, . . . , $N_c$} and i≠j. That is, the RL agents 210 may optimize the load balancing of active UEs by performing actions that adjust the values of the active UE load balancing thresholds.

Idle UE load balancing may refer to load balancing that uses cell reselection to influence the cell in which a UE is camped on while the UE is not transmitting data (e.g., the UE is in an idle state). If or when the UE becomes active, the UE may remain on the camped cell unless a cell handover is triggered. This approach may reduce the likelihood of data transmission delays that may be caused by handovers when the UE becomes active. The condition for cell reselection may be calculated using Equation 2:

$$RSRP_i < \beta_{i,j} \text{ and } RSRP_j > \gamma_{i,j} \quad \text{(Eq. 2)}$$

where $\beta_{i,j}$ and $\gamma_{i,j}$ represent the thresholds for changing the UE from camped cell i to cell j. Hence, changing $\beta_{i,j}$ and $\gamma_{i,j}$ for all i,j ∈ {1, . . . , $N_c$} such that i≠j may allow for control of the distribution of idle UEs across the cells of a base station. That is, the RL agents 210 may optimize the load balancing of idle UEs by performing actions that adjust the values of the idle UE load balancing thresholds.

In some embodiments, the RL agents 210 may measure load balancing performance in a sector using at least one of the throughput-based metrics shown in Equations 3-6:

$$G_{min} = \min_{i \in \{1,\ldots,N_c\}} x_i \quad \text{(Eq. 3)}$$

$$G_{avg} = \frac{1}{N_c} \sum_{i=1}^{N_c} x_i \quad \text{(Eq. 4)}$$

$$G_{sd} = \sqrt{\frac{1}{N_c} \sum_{i=1}^{N_c} (x_i - G_{avg})^2} \quad \text{(Eq. 5)}$$

$$G_{<\chi} = \sum_{i=1}^{N_c} 1(x_i < \chi) \quad \text{(Eq. 6)}$$

where $G_{min}$ represents a minimum throughput among the cells, $G_{avg}$ represents the average throughput over all cells, $G_{sd}$ represents the standard deviation of the throughput of the cells, and $G_{<\chi}$ represents a number of cells that have a throughput lower than a threshold $\chi$.

Alternatively or additionally, the RL agents 210 may maximize a cumulative reward 218 based on at least one of the throughput-based metrics shown in Equation 3. For example, the RL agent 210 may maximize a reward 218 by maximizing the $G_{min}$ metric (e.g., increasing the minimum throughput), which may improve a throughput performance of the worst performing cell. For another example, the RL agent 210 may maximize a reward 218 by maximizing the $G_{avg}$ metric (e.g., increasing the average throughput), which may improve the overall throughput performance of the sector. For another example, the RL agent 210 may maximize a reward 218 by maximizing the $G_{sd}$ metric (e.g., decreasing the standard deviation), which may improve a fairness of the service quality among the cells. For yet another example, the RL agent 210 may maximize a reward 218 by maximizing the $G_{<\chi}$ metric (e.g., decreasing the cell count), which may reduce a number of congested cells when threshold x is chosen as a small constant.

The traffic scenario clustering and load balancing process 200 may be provided with a set of traffic scenarios 212, such as $\{M_i\}_{i=1}^N$. Each traffic scenario 212 may correspond to traffic dynamics at a sector and may be defined as a Markov Decision Process (MDP) as shown in Equation 7:

$$M_i = (S, A, p_i, \rho_i, \mu_i) \quad \text{(Eq. 7)}$$

with shared continuous state and discrete action spaces S and A, respectively. Each traffic scenario $M_i$ may have a corresponding initial state distribution $\mu_i(s_0)$ at a time step t=0, state transition probability $p_i(s_t|s_{t-1}, a_{t-1})$ and reward $r_t=\rho_i(s_t)$ for all $t\in\{1, \ldots, T\}$ with $s_t\in S$, $a_t\in A$, $r_t\in\mathbb{R}$ and T as the time horizon. The initial state and transition distributions may be shaped by the regular (e.g., typical) data traffic demands at the sector, which may vary according to, but not limited to, demographic, geographic, and temporal factors.

In some embodiments, each state $s_t\in S$ may represent a high dimensional vector that comprises the number of active UEs in each cell, the bandwidth utilization of each cell, and the average throughput of each cell. Alternatively or additionally, these features may be averaged over each time step.

In some embodiments, each action $a_t\in A$ may represent a high dimensional vector of active UE load balancing control parameters $\alpha_{i,j}$, and idle UE load balancing control parameters $\beta_{i,j}$ and $\gamma_{i,j}$. Each dimension may be discretized and bounded based on system requirements.

In some embodiments, the reward $r_t\in\mathbb{R}$ at time step t may represent the weighted average of the system metrics using information in the corresponding state $s_t$.

In some embodiments, standard RL algorithms, such as proximal policy optimization (PPO), may be applied to each traffic scenario $M_i$ to approximate an optimal policy $\pi_i(a_t|s_t)$ that can maximize the expected return according to Equation 8:

$$R_t = \left[\mathbb{E}_{\tau\sim\pi_i}\left[\sum_{k=t}^{T-1}\gamma^{k-t}r_{k+1} \mid s_t, a_t\right]\right] \quad\text{(Eq. 8)}$$

where $\tau=(s_t, a_t, r_{t+1}, \ldots, s_{T-1}, a_{T-1}, r_T, s_T)$ may represent a trajectory sampled with $\pi_i$, and $\gamma$ may represent the discount factor for the reward. Consequently, two MDPs may exhibit similar or different behaviors depending on their corresponding state transition functions. Therefore, an optimal action under a same state in one MDP may be a sub-optimal action in another MDP. As described herein, aspects of the present disclosure provide for incrementally clustering similar MDPs together and outputting a clustered policy for each cluster optimized for all the MDPs in that cluster.

Figure 3:
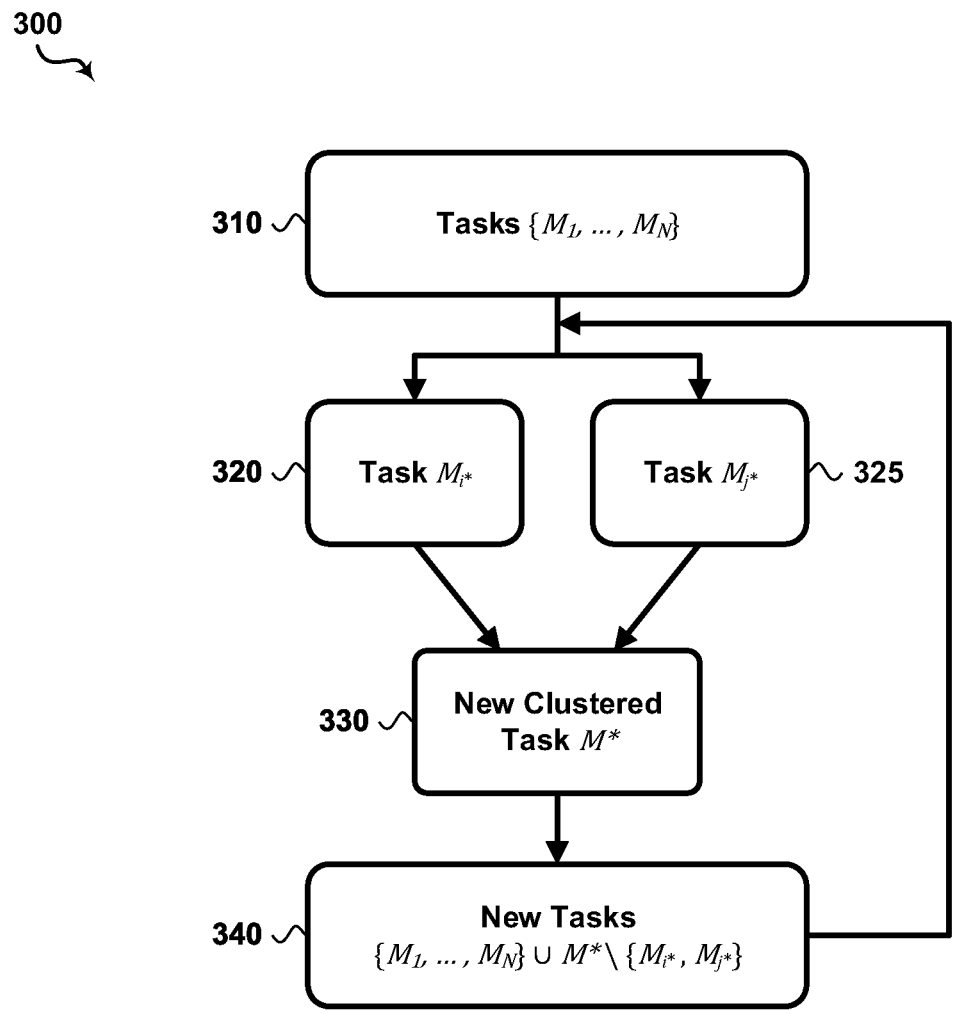
FIG. 3 depicts a flowchart that illustrates a method of traffic scenario clustering, according to one or more example embodiments.

FIG. 3 depicts a flowchart that illustrates a method of traffic scenario clustering as shown in Table 1, according to one or more example embodiments. Referring to FIG. 3 and Table 1, an example traffic scenario clustering method 300 that implements one or more aspects of the disclosure is illustrated. In some embodiments, at least a portion of the traffic scenario clustering method 300 may be performed by the device 100 of FIG. 1. Alternatively or additionally, another computing device (e.g., server, laptop, smartphone, base station, UE, etc.) that includes the traffic scenario clustering component 180 may perform at least a portion of the traffic scenario clustering method 300.

TABLE 1

Algorithm 1 Traffic scenario clustering via policy distillation

Input: Tasks $\mathcal{M}_1, \ldots, \mathcal{M}_N$, and traffic scenario-specific RL policies $\pi_1, \ldots, \pi_N$; states $S_1, \ldots, S_N$ collected by executing $\pi_1, \ldots, \pi_N$ on their respective tasks; number of desired clusters M
1:  $C \leftarrow [\mathcal{M}_1, \ldots, \mathcal{M}_N]$     ▷ Initialize list of clusters
2:  $\Pi \leftarrow [\pi_1, \ldots, \pi_N]$     ▷ Initialize cluster policies
3:  $S \leftarrow [S_1, \ldots, S_N]$     ▷ Initialize states associated w/clusters
4:  for i ← 1 to N − M do
5:      $i^*, j^* \leftarrow \text{argmin}_{i,j}\, \delta(i,j)$     ▷ See Equation 9
6:      Distill $\pi^*$ from $\pi_{i^*}$ and $\pi_{j^*}$, using $\pi_{j^*}$ as initialization TABLE 1-continued Algorithm 1 Traffic scenario clustering via policy distillation 7:      Replace $\pi_{i^*}$ and $\pi_{j^*}$ in $\Pi$ with $\pi^*$
8:      Cluster together $\mathcal{M}_{i^*}$ and $\mathcal{M}_{j^*}$ in C
9:      Merge $S_{i^*}$ and $S_{j^*}$ in S
10: end for
Output: List of task clusters $C = [c_1, \ldots, c_M]$ and RL policies for each cluster $\Pi \leftarrow [\pi_1, \ldots, \pi_N]$ In some embodiments, the traffic scenario clustering method 300 may utilize a greedy approach to incrementally merge clusters based on a similarity of the load balancing policies 214 learned for each cluster. That is, the traffic scenario clustering method 300 may select an optimal option at each clustering iteration with a goal of obtaining a globally optimal solution as a result.

At step 310, a separate RL agent 210 is trained with a single traffic scenario 212 to obtain a separate load balancing policy 214 for each traffic scenario 212 of a plurality of traffic scenarios. These load balancing policies 214 may be referred to as traffic-specific policies since the policies have been trained on a single traffic scenario. Continuing with step 310, a same number of clusters as the number of traffic scenarios may be initialized, with each cluster comprising a traffic scenario 212 and the corresponding load balancing policy 214.

As shown in FIG. 3, the traffic scenario clustering method 300 may iterate through steps 320-340 until the desired number (e.g., quantity) of clusters is reached. At steps 320 and 325, the load balancing policies of every pair of clusters are compared to find the most similar pair of policies (e.g., the policies corresponding to traffic scenarios $M_{i*}$ and $M_{j*}$). At step 330, the two traffic scenarios $M_{i*}$ and $M_{j*}$ are clustered into a new clustered traffic scenario M* and a merged load balancing policy (e.g., $\pi^*$) is distilled from the corresponding load balancing policies (e.g., $\pi_{i*}$ and $\pi_{j*}$). At step 340, the list of clusters is updated by replacing the traffic scenarios $M_{i*}$ and $M_{j*}$ with the new clustered traffic scenario M*.

In some embodiments, the load balancing policies 214 may be compared by assessing the similarity of their respective outputs. For example, the following description will be given assuming that, for each traffic scenario $M_i$ of N traffic scenarios, there is a corresponding traffic-specific policy $\pi_i$ that is trained solely on traffic scenario $M_i$, and that $S_i$ represents a set of recorded states that are encountered while executing traffic-specific policy $\pi_i$ on traffic scenario $M_i$. In such embodiments, if or when two traffic scenarios $M_i$ and $M_j$ are clustered into a single traffic scenario c, the load balancing policy associated with c should be interpreted as a distilled policy trained on all traffic scenarios in c, and the recorded states associated with c should be interpreted as the union of all recorded states $S_i$ such that traffic scenario $M_i$ is in c.

In some embodiments, a similarity measurement of how similar a policy $\pi_i$ is to policy $\pi_j$ may be computed according to Equation 9:

$$\delta(i,j)=\mathbb{E}_{s\in s_j}\|\text{argmax}_a\pi_i(a|s)-\text{argmax}_a\pi_j(a|s)\|_2 \quad\text{(Eq. 9)}$$

where (a|s) may represent the output action distribution for a given state s, the argmax function may select an optimal action for the given state s. Referring to Eq. 8, the similarity formula compares the average L2 distance of the optimum actions produced by the two policies, given the states in $S_j$ as an input. As such, a smaller value of $\delta(i, j)$ may indicate a greater policy similarity.

Notably, δ is asymmetric, since δ(i, j) is computed using $S_i$ as an input rather than $S_j$. As a result, by choosing the pair of policies that minimize δ, choosing i, j (over j, i, for example) may imply that $\pi_i$ is more amenable to traffic scenario $M_i$ than $\pi_j$ is to $M_i$.

In some embodiments, each clustering iteration may include identifying the pair of load balancing policies that minimize δ(i, j), clustering traffic scenarios $M_i$ and $M_j$ into a single traffic scenario c, merging the recorded states $S_i$ and $S_j$ that correspond to the two traffic scenarios, and distill their respective policies $\pi_i$ and $\pi_j$ into a single policy $\pi^*$, using policy $\pi_i$ to initialize the network weights.

As described above in reference to FIG. 2, the load balancing policies $\pi_i$ and $\pi_j$ may be merged using a process known as knowledge distillation. In some embodiments, the load balancing policies $\pi_i$ and $\pi_j$ may represent two teacher policies that may be used to train a student policy $\pi^*$ that may mimic both teacher policies. In such embodiments, a loss function J, as shown in Equation 10, may be used to train the student policy $\pi^*$:

$$J = \sum_{s \in S_i} D_{kl}(\pi_i(a|s)) \| \pi^*(a|s)) + \sum_{s \in S_j} D_{kl}(\pi_j(a|s)) \| \pi^*(a|s)) \quad \text{(Eq. 10)}$$

where $\pi^*(a|s)$ may be viewed as a reference distribution against which the teacher policies are compared. Thus, the differentiable KL divergence $D_{kl}$ function may be used to formulate the loss J. The recorded states $S_i$ and $S_j$ may be used as the input to the two teacher policies $\pi_i$ and $\pi_j$, respectively, and the student policy $\pi^*$ may aim to match the output of the two teacher policies $\pi_i$ and $\pi_j$.

Advantageously, the aspects presented herein may provide for traffic scenario clustering and load balancing by network devices of a wireless communication system. In some aspects, pairs of similar traffic scenario-specific load balancing policies may be identified using a greedy approach that may select an optimal option at each clustering iteration with a goal of obtaining a globally optimal solution as a result. In other aspects, a student policy is trained, using a knowledge distillation process, to mimic the behavior of the identified pair of load balancing policies. That is, the resulting load balancing policies may be optimized to perform load balancing on the corresponding traffic scenarios. Furthermore, the load balancing policies learned from the traffic scenarios are compared and merged, rather than comparing system transition dynamics (e.g., traffic scenarios) which may be difficult to model. As such, the aspects presented herein may allow for reduced overhead for managing load balancing policies and increased efficiency in the utilization of radio resources by the wireless communication system when compared to related wireless communication systems.

Figure 4:
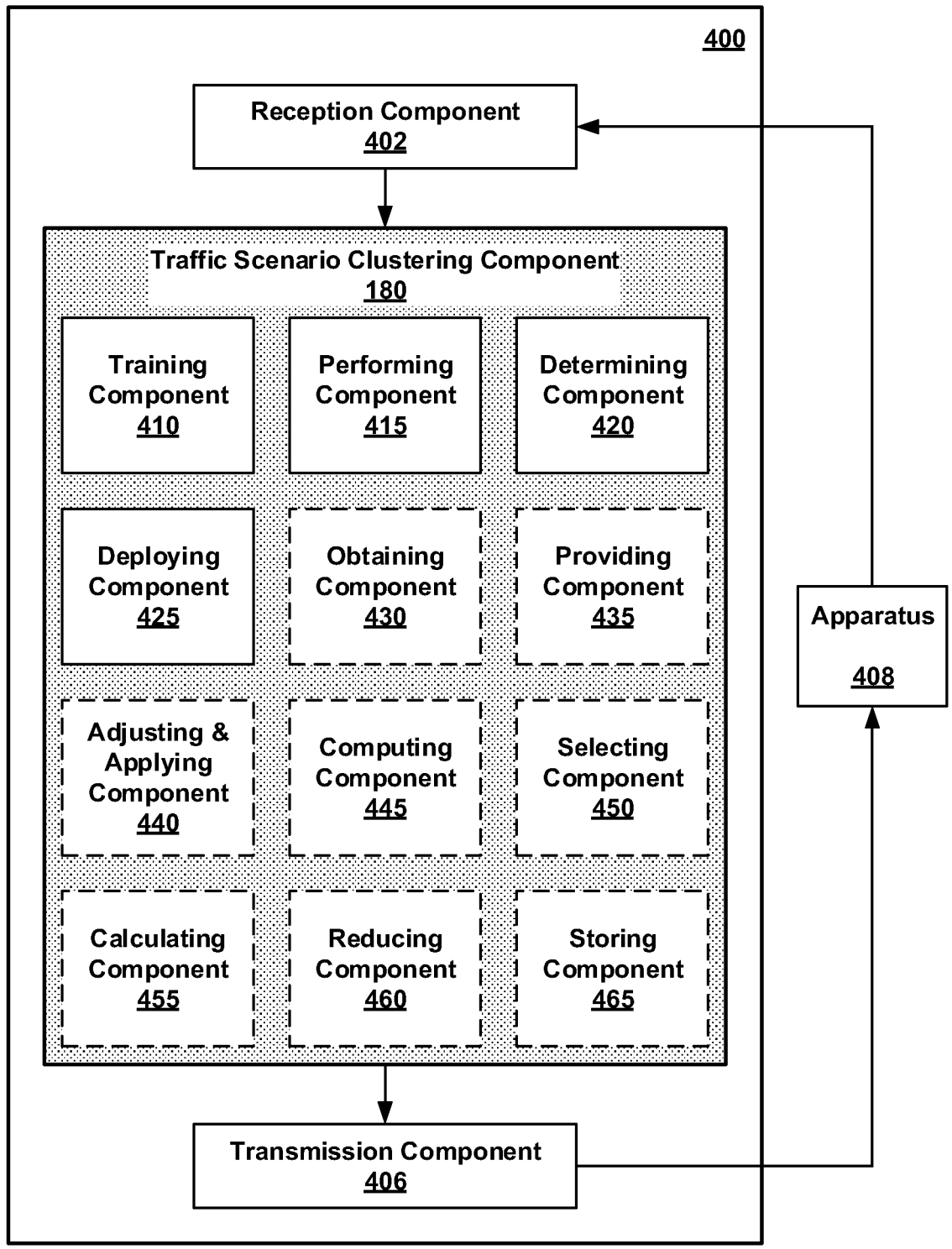
FIG. 4 illustrates a block diagram of an example apparatus for traffic scenario clustering and load balancing, according to one or more example embodiments.

FIG. 4 illustrates a block diagram of an example apparatus for traffic scenario clustering and load balancing, according to one or more example embodiments; and FIG. 4 is a block diagram of an example apparatus 400 for traffic scenario clustering and load balancing. The apparatus 400 may be a computing device (e.g., device 100 of FIG. 1) or a computing device may include the apparatus 400. In some embodiments, the apparatus 400 may include a reception component 402 configured to receive communications (e.g., wired, wireless) from another apparatus (e.g., apparatus 408), a traffic scenario clustering component 180 configured to perform traffic scenario clustering and load balancing, and a transmission component 406 configured to transmit communications (e.g., wired, wireless) to another apparatus (e.g., apparatus 408). The components of the apparatus 400 may be in communication with one another (e.g., via one or more buses or electrical connections). As shown in FIG. 4, the apparatus 400 may be in communication with another apparatus 408 (such as the policy bank 250, a database, a server, or another computing device) using the reception component 402 and/or the transmission component 406.

In some embodiments, the apparatus 400 may be configured to perform one or more operations described herein in connection with FIGS. 1-3. Alternatively or additionally, the apparatus 400 may be configured to perform one or more processes described herein, such as method 500 of FIG. 5. In some embodiments, the apparatus 400 may include one or more components of the device 100 described above in connection with FIGS. 1-3.

The reception component 402 may receive communications, such as control information, data communications, or a combination thereof, from the apparatus 408 (e.g., the policy bank 250, a database, a server, or another computing device). The reception component 402 may provide received communications to one or more other components of the apparatus 400, such as the traffic scenario clustering component 180. In some aspects, the reception component 402 may perform signal processing on the received communications, and may provide the processed signals to the one or more other components. In some embodiments, the reception component 402 may include one or more antennas, a receive processor, a controller/processor, a memory, or a combination thereof, of the device 100 described above in reference to FIG. 1.

The transmission component 406 may transmit communications, such as control information, data communications, or a combination thereof, to the apparatus 408 (e.g., the policy bank 250, a database, a server, or another computing device). In some embodiments, the traffic scenario clustering component 180 may generate communications and may transmit the generated communications to the transmission component 406 for transmission to the apparatus 408. In some embodiments, the transmission component 406 may perform signal processing on the generated communications, and may transmit the processed signals to the apparatus 408. In other embodiments, the transmission component 406 may include one or more antennas, a transmit processor, a controller/processor, a memory, or a combination thereof, of the device 100 described above in reference to FIG. 1. In some embodiments, the transmission component 406 may be co-located with the reception component 402 such as in a transceiver and/or a transceiver component.

The traffic scenario clustering component 180 may be configured to perform traffic scenario clustering and load balancing. In some embodiments, the traffic scenario clustering component 180 may include a set of components, such as a training component 410 configured to train a plurality of learning agents, a performing component 415 configured to perform at least one clustering iteration, a determining component 420 configured to determine to stop the performing of the at least one clustering iteration, and a deploying component 425 configured to deploy the plurality of control policies.

Alternatively or additionally, the traffic scenario clustering component 180 may further include an obtaining component 430 configured to obtain the plurality of traffic scenarios, a providing component 435 configured to provide initial state and state transition distributions, an adjusting and applying component 440 configured to iteratively adjust and apply at least one action vector, a computing component 445 configured to compute a similarity between the pair of control policies, a selecting component 450 configured to select a pair of control policies, a calculating component 455 configured to calculate a training loss, a reducing component 460 configured to reduce the quantity of control policies, and a storing component 465 configured to store the control policies in a policy bank.

In some embodiments, the set of components may be separate and distinct from the traffic scenario clustering component 180. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally or alternatively, a set of (one or more) components shown in FIG. 4 may perform one or more functions described as being performed by another set of components shown in FIG. 1.

Figure 5:
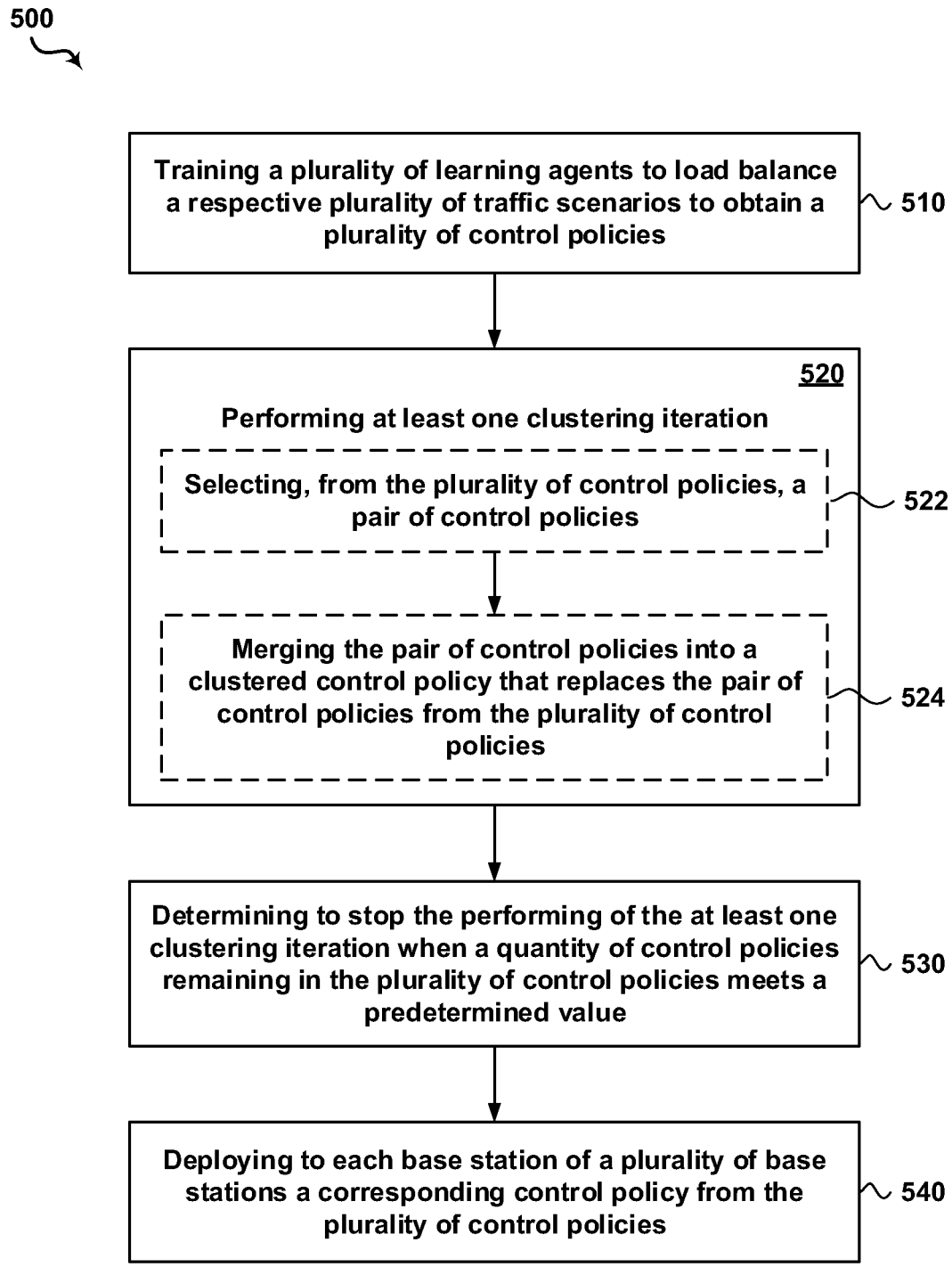
FIG. 5 illustrates a flowchart of an example method of traffic scenario clustering and load balancing by a network device, according to one or more example embodiments.

Referring to FIG. 5, in operation, an apparatus 400 may perform a method 500 of traffic scenario clustering and load balancing by a network device. The method 500 may be performed by the device 100 (which may include the memory 130 and which may be the entire device 100 and/or one or more components of the device 100, such as the processor 120, the input component 150, the output component 160, the communication interface 170, and/or the traffic scenario clustering component 180). The method 500 may be performed by the traffic scenario clustering component 180 in communication with the apparatus 408 (e.g., the policy bank 250, a database, a server, or another computing device).

At block 510 of FIG. 5, the method 500 may include training a plurality of learning agents to load balance a respective plurality of traffic scenarios to obtain a plurality of control policies. For example, in an embodiment, the device 100, the traffic scenario clustering component 180, and/or the training component 410 may be configured to or may comprise means for training a plurality of learning agents 210 to load balance a respective plurality of traffic scenarios 212 to obtain a plurality of control policies 214.

For example, the training at block 510 may include RL agents 210 taking actions 216 in an environment based on a state of the traffic scenario 212 in order to maximize a cumulative reward 218, as described in reference to FIGS. 2 and 3.

In some embodiments, the training at block 510 may further include training, using reinforcement learning, the plurality of learning agents to load balance the plurality of traffic scenarios using active UE load balancing to handover at least one actively-transmitting UE from a first cell to a second cell. In other optional or additional embodiments, the training at block 510 may further include training, using the reinforcement learning, the plurality of learning agents to load balance the plurality of traffic scenarios using idle UE load balancing to influence the cell on which at least one idle UE is camping.

In other optional or additional embodiments, the training at block 510 may further include providing, to each learning agent of the plurality of learning agents, at least one of an initial state and the respective traffic scenario, causing that learning agent to encounter a set of states that is shaped by the respective traffic scenario and a respective state transition distribution. The initial state and the set of states may consist of high-dimensional vectors that comprise at least one of a quantity of active UE in a cell, a bandwidth utilization of the cell, an average throughput of the cell, and physical resource block usage in the cell. The respective state transition distribution may describe a probability of encountering a state given a previous state and a previous action taken by that learning agent.

In other optional or additional embodiments, the training at block 510 may further include iteratively adjusting and applying at least one action vector of load balancing control parameters that comprise at least one of an active handover threshold and a camping cell threshold.

In other optional or additional embodiments, the training at block 510 may further include determining, based on a reward vector received in response to applying an action vector of the at least one action vector, the control policy of the plurality of control policies that maximizes the reward vector of the respective traffic scenario. The reward vector may comprise weighted averages of cell performance metrics.

Further, for example, the training at block 510 may be performed to create the traffic scenario specific load balancing policies that may be optimized to perform load balancing on the corresponding traffic scenarios. As such, the aspects presented herein may allow for reduced overhead for managing load balancing policies and increased efficiency in the utilization of radio resources by the wireless communication system when compared to related wireless communication systems.

In another optional or additional aspect, the method 500 may further include obtaining the plurality of traffic scenarios. In such aspects, the plurality of traffic scenarios may correspond to network traffic of the plurality of base stations, and the plurality of base stations may serve a geographic region.

At block 520 of FIG. 5, the method 500 may include performing at least one clustering iteration, each clustering iteration comprising selecting, from the plurality of control policies, a pair of control policies, and merging the pair of control policies into a clustered control policy that replaces the pair of control policies from the plurality of control policies. For example, in an embodiment, the device 100, the traffic scenario clustering component 180, and/or the performing component 415 may be configured to or may comprise means for performing at least one clustering iteration, each clustering iteration comprising selecting, from the plurality of control policies 214, a pair of control policies 214, and merging the pair of control policies 214 into a clustered control policy that replaces the pair of control policies from the plurality of control policies 214.

For example, the performing at block 520 may include computing a similarity between every pair of policies of the load balancing policies 214, as described in reference to FIGS. 2 and 3.

In some embodiments, the performing at block 520 may further include computing a similarity between the pair of control policies based on a difference between a first output of a first control policy of the pair of control policies and a second output of a second control policy of the pair of control policies given a set of states encountered by the first control policy.

In other optional or additional embodiments, the performing at block 520 may further include selecting from the plurality of control policies, the pair of control policies having a smallest difference between each control policy of the pair of control policies when compared to other differences between remaining pairs of control policies of the plurality of control policies.

In other optional or additional embodiments, the difference between the first output of the first control policy of the pair of control policies and the second output of the second control policy of the pair of control policies given the set of states encountered by the first control policy may be different to another difference between the first output of the first control policy of the pair of control policies and the second output of the second control policy of the pair of control policies given the set of states encountered by the second control policy.

In other optional or additional embodiments, the performing at block 520 may further include training, using knowledge distillation, a student policy to mimic each control policy of the pair of control policies. In such embodiments, the performing at block 520 may further include calculating a training loss of the student policy based on a first divergence between the student policy and a first control policy of the pair of control policies and a second divergence between the student policy and a second control policy of the pair of control policies. In such embodiments, the performing at block 520 may further include selecting, as the clustered control policy, the student policy that minimizes the training loss.

In other optional or additional embodiments, the performing at block 520 may further include reducing the quantity of control policies in the plurality of control policies by one.

Further, for example, the performing at block 520 may be performed to reduce the amount of load balancing policies. As such, the aspects presented herein may allow for reduced overhead for managing load balancing policies and increased efficiency in the utilization of radio resources by the wireless communication system when compared to related wireless communication systems.

At block 530 of FIG. 5, the method 500 may include determining to stop the performing of the at least one clustering iteration when a quantity of control policies remaining in the plurality of control policies meets a predetermined value. For example, in an embodiment, the device 100, the traffic scenario clustering component 180, and/or the determining component 420 may be configured to or may comprise means for determining to stop the performing of the at least one clustering iteration when a quantity of control policies remaining in the plurality of control policies meets a predetermined value.

For example, the determining at block 530 may include determining whether to stop the performing of pair identifying of the pair identifier component 220 and the merging of the policy merger component 230 when a quantity of load balancing policies 214 remaining in the plurality of load balancing policies 214 meets a predetermined value, as described in reference to FIGS. 2 and 3.

Further, for example, the determining at block 530 may be performed to reduce the amount of load balancing policies down to a desired amount. As such, the aspects presented herein may allow for reduced overhead for managing load balancing policies and increased efficiency in the utilization of radio resources by the wireless communication system when compared to related wireless communication systems.

At block 540 of FIG. 5, the method 500 may include deploying to each base station of a plurality of base stations a corresponding control policy from the plurality of control policies. For example, in an embodiment, the device 100, the traffic scenario clustering component 180, and/or the deploying component 425 may be configured to or may comprise means for deploying to each base station of a plurality of base stations a corresponding control policy from the plurality of control policies.

For example, the deploying at block 540 may include selecting, from the policy bank 250, the corresponding control policy from the plurality of control policies for each base station of the plurality of base stations, based on selection criteria, as described in reference to FIGS. 2 and 3.

In some embodiments, the deploying at block 540 may further include storing the plurality of control policies in a policy bank 250.

In other optional or additional embodiments, the deploying at block 540 may further include deploying a same corresponding control policy from the plurality of control policies to two or more base stations of the plurality of base stations.

Further, for example, the deploying at block 540 may be performed to deploy the traffic scenario specific load balancing policies that may be optimized to perform load balancing on the corresponding traffic scenarios. As such, the aspects presented herein may allow for reduced overhead for managing load balancing policies and increased efficiency in the utilization of radio resources by the wireless communication system when compared to related wireless communication systems.

The following aspects are illustrative only and aspects thereof may be combined with aspects of other embodiments or teaching described herein, without limitation.

Aspect 1 is a method for traffic scenario clustering and load balancing by a network device, including training a plurality of learning agents to load balance a respective plurality of traffic scenarios to obtain a plurality of control policies. The method further includes performing at least one clustering iteration. Each clustering iteration includes selecting, from the plurality of control policies, a pair of control policies, and merging the pair of control policies into a clustered control policy that replaces the pair of control policies from the plurality of control policies. The method further includes determining to stop the performing of the at least one clustering iteration when a quantity of control policies remaining in the plurality of control policies meets a predetermined value. The method further includes deploying to each base station of a plurality of base stations a corresponding control policy from the plurality of control policies.

In Aspect 2, the method of Aspect 1 includes obtaining the plurality of traffic scenarios. The plurality of traffic scenarios correspond to network traffic of the plurality of base stations. The plurality of base stations serve a geographic region.

In Aspect 3, the method of any of Aspects 1 or 2 includes training, using reinforcement learning, the plurality of learning agents to load balance the plurality of traffic scenarios using active UE load balancing to handover at least one actively-transmitting UE from a first cell to a second cell. The method further includes training, using the reinforcement learning, the plurality of learning agents to load balance the plurality of traffic scenarios using idle UE load balancing to influence a third cell on which at least one idle UE is camping.

In Aspect 4, the method of any of Aspects 1 to 3 includes providing, to each learning agent of the plurality of learning agents, an initial state and state transition distributions that are shaped by the respective traffic scenario. The initial state and the state transition distributions are high-dimensional vectors that comprise at least one of a quantity of active UE in a cell, a bandwidth utilization of the cell, an average throughput of the cell, and physical resource block usage in the cell. The method further includes iteratively adjusting and applying at least one action vector of load balancing control parameters that comprise at least one of an active handover threshold and a camping cell threshold. The method further includes determining, based on the at least one action vector, the control policy of the plurality of control policies that maximizes a reward vector of the respective traffic scenario. The reward vector includes weighted averages of cell performance metrics.

In Aspect 5, the method of any of Aspects 1 to 4 includes computing a similarity between the pair of control policies based on a difference between a first output of a first control policy of the pair of control policies and a second output of a second control policy of the pair of control policies given a set of states encountered by the first control policy. The method further includes selecting from the plurality of control policies, the pair of control policies having a smallest difference between each control policy of the pair of control policies when compared to other differences between remaining pairs of control policies of the plurality of control policies.

In Aspect 6, the method of Aspect 5 includes where the difference between the first output of the first control policy of the pair of control policies and the second output of the second control policy of the pair of control policies given the set of states encountered by the first control policy is different than another difference between the first output of the first control policy of the pair of control policies and the second output of the second control policy of the pair of control policies given the set of states encountered by the second control policy.

In Aspect 7, the method of any of Aspects 1 to 6 includes training, using knowledge distillation, a student policy to mimic each control policy of the pair of control policies. The method further includes calculating a training loss of the student policy based on a first divergence between the student policy and a first control policy of the pair of control policies and a second divergence between the student policy and a second control policy of the pair of control policies. The method further includes selecting, as the clustered control policy, the student policy that minimizes the training loss.

In Aspect 8, the method of any of Aspects 1 to 7 includes reducing the quantity of control policies in the plurality of control policies by one.

In Aspect 9, the method of any of Aspects 1 to 8 includes storing the plurality of control policies in a policy bank. The method further includes selecting, from the policy bank, the corresponding control policy from the plurality of control policies for each base station of the plurality of base stations, based on selection criteria.

In Aspect 10, the method of any of Aspects 1 to 9 includes deploying a same corresponding control policy from the plurality of control policies to two or more base stations of the plurality of base stations.

Aspect 11 is an apparatus for traffic scenario clustering and load balancing including a memory storage storing computer-executable instructions, and a processor communicatively coupled to the memory storage, where the processor is configured to perform one or more of the methods of any of Aspects 1 to 10.

Aspect 12 is an apparatus for traffic scenario clustering and load balancing including means for performing one or more of the methods of any of Aspects 1 to 10.

Aspect 13 is a non-transitory computer-readable storage medium storing computer-executable instructions for traffic scenario clustering and load balancing by a network device, the computer-executable instructions including computer-executable instructions for performing one or more of the methods of any of Aspects 1 to 10.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1, 2, and 5) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method for traffic scenario clustering and load balancing by a network device, comprising:
    training a plurality of learning agents to load balance a respective plurality of traffic scenarios to obtain a plurality of control policies;
    performing at least one clustering iteration, each clustering iteration comprising:
        selecting, from the plurality of control policies, a pair of control policies; and
        merging the pair of control policies into a clustered control policy that replaces the pair of control policies from the plurality of control policies;
    determining to stop the performing of the at least one clustering iteration when a quantity of control policies remaining in the plurality of control policies meets a predetermined value; and
    deploying to each base station of a plurality of base stations a corresponding control policy from the plurality of control policies.

2. The method of claim 1, further comprising:
    obtaining the plurality of traffic scenarios, the plurality of traffic scenarios corresponding to network traffic of the plurality of base stations, the plurality of base stations serving a geographic region.

3. The method of claim 1, wherein the training of the plurality of learning agents comprises:
    training, using reinforcement learning, the plurality of learning agents to load balance the plurality of traffic scenarios using active user equipment (UE) load balancing to handover at least one actively-transmitting UE from a first cell to a second cell; and
    training, using the reinforcement learning, the plurality of learning agents to load balance the plurality of traffic scenarios using idle UE load balancing which uses cell reselection for distribution of at least one idle UE.

4. The method of claim 1, wherein the training of the plurality of learning agents comprises:
    providing, to each learning agent of the plurality of learning agents, at least one of an initial state and the respective traffic scenario, causing that learning agent to encounter a set of states that is shaped by the respective traffic scenario and a respective state transition distribution, the initial state and the set of states being high-dimensional vectors that comprise at least one of a quantity of active user equipment (UE) in a cell, a bandwidth utilization of the cell, an average throughput of the cell, and physical resource block usage in the cell, and the respective state transition distribution indicating a probability of encountering a state given a previous state and a previous action taken by that learning agent;
    iteratively adjusting and applying at least one action vector of load balancing control parameters that comprise at least one of an active handover threshold and a camping cell threshold; and
    determining, based on a reward vector received in response to applying an action vector of the at least one action vector, the corresponding control policy from the plurality of control policies that maximizes the reward vector of the respective traffic scenario, the reward vector comprising weighted averages of cell performance metrics.

5. The method of claim 1, wherein the selecting of the pair of control policies comprises:
    computing a similarity between the pair of control policies based on a difference between a first output of a first control policy of the pair of control policies and a second output of a second control policy of the pair of control policies given a set of states encountered by the first control policy; and
    selecting from the plurality of control policies, the pair of control policies having a smallest difference between each control policy of the pair of control policies when compared to other differences between remaining pairs of control policies of the plurality of control policies.

6. The method of claim 5, wherein the difference between the first output of the first control policy of the pair of control policies and the second output of the second control policy of the pair of control policies given the set of states encountered by the first control policy is different than another difference between the first output of the first control policy of the pair of control policies and the second output of the second control policy of the pair of control policies given the set of states encountered by the second control policy.

7. The method of claim 1, wherein the merging of the pair of control policies comprises:
- training, using knowledge distillation, a student policy to mimic each control policy of the pair of control policies;
- calculating a training loss of the student policy based on a first divergence between the student policy and a first control policy of the pair of control policies and a second divergence between the student policy and a second control policy of the pair of control policies; and
- selecting, as the clustered control policy, the student policy that minimizes the training loss.

8. The method of claim 1, wherein the merging of the pair of control policies comprises reducing the quantity of control policies in the plurality of control policies by one.

9. The method of claim 1, further comprising:
- storing the plurality of control policies in a policy bank, wherein the deploying to each base station of the plurality of base stations of the corresponding control policy comprises selecting, from the policy bank, the corresponding control policy from the plurality of control policies for each base station of the plurality of base stations, based on selection criteria.

10. The method of claim 1, wherein the deploying to each base station of the plurality of base stations of the corresponding control policy comprises:
- deploying a same corresponding control policy from the plurality of control policies to two or more base stations of the plurality of base stations.

11. An apparatus for traffic scenario clustering and load balancing, comprising:
- a memory storage storing computer-executable instructions; and
- a processor communicatively coupled to the memory storage, wherein the processor is configured to execute the computer-executable instructions and cause the apparatus to:
  - train a plurality of learning agents to load balance a respective plurality of traffic scenarios to obtain a plurality of control policies;
  - perform at least one clustering iteration, wherein to perform each clustering iteration of the least one clustering iteration comprises to:
    - select, from the plurality of control policies, a pair of control policies; and
    - merge the pair of control policies into a clustered control policy that replaces the pair of control policies from the plurality of control policies;
  - determine to stop to perform the at least one clustering iteration when a quantity of control policies remaining in the plurality of control policies meets a predetermined value; and
  - deploy to each base station of a plurality of base stations a corresponding control policy from the plurality of control policies.

12. The apparatus of claim 11, wherein the computer-executable instructions further cause the apparatus to:
- obtain the plurality of traffic scenarios, the plurality of traffic scenarios corresponding to network traffic of the plurality of base stations, the plurality of base stations serving a geographic region.

13. The apparatus of claim 11, wherein the computer-executable instructions to train the plurality of learning agents further cause the apparatus to:
- train, using reinforcement learning, the plurality of learning agents to load balance the plurality of traffic scenarios using active user equipment (UE) load balancing to handover at least one actively-transmitting UE from a first cell to a second cell; and
- train, using the reinforcement learning, the plurality of learning agents to load balance the plurality of traffic scenarios using idle UE load balancing which uses cell reselection for distribution of at least one idle UE.

14. The apparatus of claim 11, wherein the computer-executable instructions to train the plurality of learning agents further cause the apparatus to:
- provide, to each learning agent of the plurality of learning agents, at least one of an initial state and the respective traffic scenario, causing that learning agent to encounter a set of states that is shaped by the respective traffic scenario and a respective state transition distribution, the initial state and the set of states being high-dimensional vectors that comprise at least one of a quantity of active user equipment (UE) in a cell, a bandwidth utilization of the cell, an average throughput of the cell, and physical resource block usage in the cell, and the respective state transition distribution indicating a probability of encountering a state given a previous state and a previous action taken by that learning agent;
- iteratively adjust and apply at least one action vector of load balancing control parameters that comprise at least one of an active handover threshold and a camping cell threshold; and
- determine, based on a reward vector received in response to applying an action vector of the at least one action vector, the corresponding control policy from the plurality of control policies that maximizes the reward vector of the respective traffic scenario, the reward vector comprising weighted averages of cell performance metrics.

15. The apparatus of claim 11, wherein the computer-executable instructions to select the pair of control policies further cause the apparatus to:
- compute a similarity between the pair of control policies based on a difference between a first output of a first control policy of the pair of control policies and a second output of a second control policy of the pair of control policies given a set of states encountered by the first control policy; and
- select from the plurality of control policies, the pair of control policies having a smallest difference between each control policy of the pair of control policies when compared to other differences between remaining pairs of control policies of the plurality of control policies.

16. The apparatus of claim 15, wherein the difference between the first output of the first control policy of the pair of control policies and the second output of the second control policy of the pair of control policies given the set of states encountered by the first control policy is different than another difference between the first output of the first control policy of the pair of control policies and the second output of the second control policy of the pair of control policies given the set of states encountered by the second control policy.

17. The apparatus of claim 11, wherein the computer-executable instructions to merge the pair of control policies further cause the apparatus to:
- train, using knowledge distillation, a student policy to mimic each control policy of the pair of control policies;
- calculate a training loss of the student policy based on a first divergence between the student policy and a first control policy of the pair of control policies and a second divergence between the student policy and a second control policy of the pair of control policies; and select, as the clustered control policy, the student policy that minimizes the training loss.

18. The apparatus of claim 11, wherein the computer-executable instructions to merge the pair of control policies further cause the apparatus to:

reduce the quantity of control policies in the plurality of control policies by one.

19. The apparatus of claim 11, wherein the computer-executable instructions further cause the apparatus to:

store the plurality of control policies in a policy bank, wherein the computer-executable instructions to deploy to each base station of the plurality of base stations of the corresponding control policy further cause the apparatus to select, from the policy bank, the corresponding control policy from the plurality of control policies for each base station of the plurality of base stations, based on selection criteria.

20. A non-transitory computer-readable storage medium storing computer-executable instructions for traffic scenario clustering and load balancing by a network device, the computer-executable instructions being configured, when executed by one or more processors of the network device, to cause the network device to:

train a plurality of learning agents to load balance a respective plurality of traffic scenarios to obtain a plurality of control policies;

perform at least one clustering iteration, wherein to perform each clustering iteration of the least one clustering iteration comprises to:

select, from the plurality of control policies, a pair of control policies; and merge the pair of control policies into a clustered control policy that replaces the pair of control policies from the plurality of control policies;

determine to stop to perform the at least one clustering iteration when a quantity of control policies remaining in the plurality of control policies meets a predetermined value; and deploy to each base station of a plurality of base stations a corresponding control policy from the plurality of control policies.

* * * * *